United States Patent [19]

Tucker

[11] 4,218,988
[45] Aug. 26, 1980

[54] AMPHIBIOUS WALKING VEHICLE

[76] Inventor: John T. Tucker, 531 Ivywood Dr., Oxnard, Calif. 93030

[21] Appl. No.: 901,916

[22] Filed: May 1, 1978

[51] Int. Cl.$^2$ .......................... B60F 3/00; B62D 57/02
[52] U.S. Cl. ...................................... 440/113; 180/8 R
[58] Field of Search ............... 115/1 R, 2, 9; 180/8 R, 180/8 C

[56] References Cited
U.S. PATENT DOCUMENTS

| | | | |
|---|---|---|---|
| 2,381,235 | 8/1945 | Tucker | 115/1 R |
| 2,667,937 | 2/1954 | Tucker | 180/8 R |
| 3,034,591 | 5/1962 | Bell | 180/8 E |
| 3,118,419 | 1/1964 | Bell | 115/1 R |

Primary Examiner—Trygve M. Blix
Assistant Examiner—Jesus D. Sotelo
Attorney, Agent, or Firm—Jessup & Beecher

[57] ABSTRACT

An amphibious walking vehicle having a mobile and stable structure which moves at a constant speed whether the vehicle is on land or on water. In the water the vehicle floats and is driven by a conventional propeller system. However, when on land the vehicle moves on pontoons which are successively moved ahead while the decks and superstructures which carry the payload are shifted from the stationary pontoon. The decks rest on an inboard or center pontoon and a pair of independent outboard pontoons which are connected to operate together. The amphibious walking transporter has a gear drive system which sequentially moves the center or inboard pontoon ahead while the outboard pontoons are stationary while carrying the payload, and vice versa. Each pontoon is successively moved by a gear system, including a sequential half-gear system and gear racks in combination with an ovate chain drive connected to a motor or engine through a chain drive floating shaft and rocker arms. A conventional dual propeller system is geared to the engine for amphibious use of the transporter.

10 Claims, 33 Drawing Figures

Fig. 14a. THE A.T. FOR USE INLAND CLEARING OPERATIONS

Fig. 14b.

Fig. 15. THE A.T. IN BEACH SALVAGE OPERATIONS

Fig. 16a. SUGAR CANE HARVESTING; WITH THE USE OF THE A.T.

Fig. 17. TREE PLANTING OPERATIONS

Fig. 18a. A.T. WITH ACCESSORIES FOR MANUAL OPERATION OF EARTH AND ROCK MOVING EQUIPMENT IN CANAL CONSTRUCTION

Fig. 19a. A.T. FOR USE IN EXCAVATING CANALS OR DRAINAGE WORKS

Fig. 20a. SHOWING EQUIPMENT LAYOUT FOR A CONTINUOUS CONCRETE LINING OPERATION FOR CANALS AND DRAINAGE DITCHES

AMPHIBIOUS WALKING VEHICLE

BACKGROUND OF THE INVENTION

This invention relates to amphibious transporters capable of movement on land, and in particular relates to walking vehicles which travel over land or over marshy areas by walking action on a pair of pontoon-like members supporting stable on-deck structures that move forward or backward at a constant rate of travel.

Such amphibious transporters or walking vehicles are constructed to have a pair of pontoons which are successively moved ahead by a walking action for use on land or over marshy areas and which may also operate as a watercraft by means of a conventional propeller and rudder at the stern of the vehicle. The problem of walking has been solved by nature in man and many other animals by providing at least two supports such as legs which are lifted alternately and advanced for going forward or reversed if backward movement is desired. The upper half of the body is supported by the legs and is relatively stationary to the ground at all times during walking, while one leg alternately bears the body weight which is shifted as each leg and foot is moved for each step either forward or backward. The weight associated with the supporting structure (the legs) which is lifted and moved forward or backward with each step moves steadily forward or backward in a more or less level plane without a noticeable lift or variation in the rate of travel. Speeding up the rate of travel beyond a certain amount, the walking speed passes into a phase of travel which is termed running. This type of motion is a completely different system of motion than walking. In this type of motion during movement of one support (the leg and foot) the other support is off the ground. That is, both supports for a short part of the movement cycle, depending upon the speed, will be off the ground. This results in the main body portion moving forward in a series of waves or undulations without a substantial shift of weight from one support to the other. Thus, movement of the body or mechanical structure of large size must necessarily be restricted to a walking action in order to maintain stability.

The object then is to search for and realize a walking device or mechanism which incorporates the design of a normal walking action during which relatively light-weight supports are alternately lifted and moved either forward or backward, as desired, while the main weight of the structure or body moves forward or backward uniformly and steadily or constantly in a level plane. The speed at which the movement can be attained is necessarily limited as in nature.

In order to produce an effective mechanism it is important that certain rules should be followed. Among these are that the weight of the body to be moved should be kept to a minimum. Also, the length of each step should be made as long as practical in order to reduce such steps and the number of lifts or transfers of weight in any given distance. Thirdly, the height of the lift of the supports should be made as small as is compatible with the type of terrain to be traversed. With the use of a floating bearing and bushing, the height of each step can be made adjustable. Lastly, as it requires power to accelerate the supports which increases as cube of speed practicalities dictate the speed of the walking action be limited to a reasonable amount. A conservative speed would be from four to six miles per hour.

In order to meet the requirements set forth above, the vehicle disclosed herein is designed with all of the payload and as much as possible of the structural weight and auxiliary equipment be carried or concentrated in the upper platforms or body and superstructure and not in the supports. The upper portion or body is to be relatively free from the action of the supports and allowed to move forward or rearward at a uniform rate of travel at a constant level condition. For purposes of balance it is necessary to construct a device with three supports or feet, the center support having a ground-bearing area equal to or nearly equal to the ground-bearing area of the two outside feet. These supports which are designed and used as pontoons, alternately act as a stable roadway for the upper platform to roll on at all times. The supports are reduced to the absolute minimum in weight and a maximum in bearing area with the height of step or lift being preferably adjustable while underway by the operator of the transporter. Since the device is amphibious, the feet or pontoons are constructed to provide buoyancy and may be controlled by a pumping system in order to control the depth to which the unit will operate. Also, by sloping the forward and aft bows and adding grousers over portions of the supports, the transporter will have the ability to surmount obstacles or crush obstacles so they can be passed over. A number of power systems are suitable and can be incorporated into the transporter. The power system can be diesel or mechanical, which may impose very high pressures on gear teeth bearings and drive chains or diesel-electric which is preferred in view of the need to master heavy forces and slow speeds. The latter combination would provide the flexibility which could be obtainable through electric controls strategically located.

The necessity of transporting personnel and equipment over a variety of terrain and water dictates the need for improved equipment, especially having off-the-road vehicle mobility. Such vehicles can be of great use in excavations, cultivation of new lands, and other construction work, such as building canals. One such device is disclosed in U.S. Pat. No. 2,667,937, issued Feb. 2, 1954, to the same inventor of the vehicle disclosed herein. There were several disadvantages with this device, including the fact that the deck was not stable and was moved with a pair of the pontoons. Further, the original device disclosed in the above-identified patent was not easily turned when used in its land mode. It would be much more desirable if a device could be constructed which could be easily turned and have a stable level platform for working on.

SUMMARY OF THE INVENTION

The purpose of the present invention is to provide an improved amphibious transporter which provides greater mobility and versatility when used on dry land. This invention is an improvement on the walking vehicle disclosed in U.S. Pat. No. 2,667,937, issued Feb. 2, 1954, to the inventor of the walking vehicle disclosed herein.

The amphibious transporter and walking vehicle discllosed herein has a constant speed level deck supported and independently movable on three supports or pontoons. The vehicle has a center or inboard pontoon and two outboard pontoons which are connected for movement as a unit. The pontoons are driven sequentially by a gear rack and offset half-gears driven by a motor and a gear and chain drive system. The gear rack and half-gear successively lift the pontoons for movement by an ovate drive chain connected to the engine and drive system by rocker arms and chain drives. The inboard pontoon is also supported on a rotatable pivot so that it may be rotated a few degrees to the right or left to effect turning of the amphibious transporter walking vehicle.

With the addition of various accessories to the deck and sides of the amphibious walking vehicle, it can be accommodated for a variety of uses. With a crane and tow lines it can be used for inland clearing operations or for beach salvaging operations. With power drills, bucket loaders and conveyors the walking vehicle can be adapted for earth and rock moving for use in canal construction. Various devices such as bulldozer blades and other apparatus can be attached to the body of the transporter for various construction projects.

It is one object of the present invention to provide an amphibious transporter walking vehicle which has a constant speed and level deck.

Another object of the present invention is to provide an amphibious transporter walking vehicle with a simplified turning apparatus.

Another object of the present invention is to provide an amhibious transporter walking vehicle utilizing ovate chain drives.

Yet another object of the present invention is to provide an amphibious transporter walking vehicle utilizing half-gears and gear racks for pontoon movement.

Still another object of the present invention is to provide an amphibious transporter walking vehicle capable of adaptation for a variety of construction projects.

Other objects, advantages and novel features of the invention will become apparent from the following detailed description of the invention when considered in conjunction with the accompanying drawings wherein like reference numbers identify like parts throughout.

BRIEF DESCRIPTION OF THE DRAWINGS

FIGS. 19A through 19F illustrate schematically various modifications and addition of accessories for excavation of canals or drainage projects.

FIGS. 20A through 20D illustrate schematically the equipment layout for concrete lining operations for canals and drainage ditches.

DETAILED DESCRIPTION OF THE PREFERRED EMBODIMENT

Figures 1, 2:
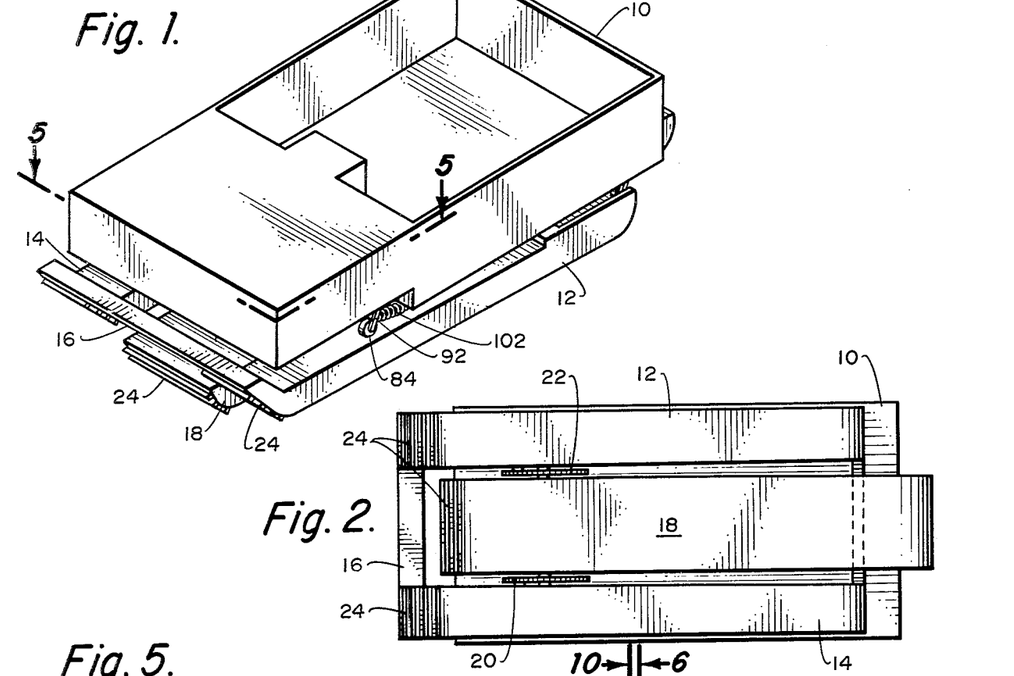
FIG. 1 is an isometric view of the amphibious transporter, showing the principal operating elements.
FIG. 2 is a bottom view of the amphibious transporter walking vehicle.

Referring now to FIG. 1, there is illustrated an amphibious transporter and its principal operating elements. The amphibious transporter has a constant speed level deck member 10 resting on a pair of outboard pontoons 12 and 14, joined by bars 16 and an inboard pontoon 18. The top deck moves with constant speed parallel to the ground on the inboard or outboard pontoons as will be more clearly described hereinafter.

The bottom view of FIG. 2 shows more clearly the outboard pontoons 12 and 14 and the inboard pontoon 18 which are joined at the forward end by ovate chain drives 20 and 22. The bars or cross-ties 16 stabilize the forward and stern ends of the outboard pontoons 12 and 14. The pontoons may be provided with cleats or grousers 24 for climbing and tearing down walls and embankments.

The movement of the amphibious transporter is very similar to that described in the U.S. Pat. No. 2,667,937 of Feb. 2, 1954, which is incorporated herein by reference, except that the deck does not move with the pontoons. In the present device the stepping action of the pontoons is provided by ovate chain drives 20 and 22 with the deck 10 simultaneously moving forward on the stationary pontoon. That is, when the outboard pontoons 12 and 14 are being stepped forward, the deck is moving at a constant speed on the inboard pontoon 18. Conversely, while the inboard pontoon 18 is being moved forward, the deck is moving at a constant speed on the outboard pontoons 12 and 14. Thus, the movement of the deck is shifted from the outboard pontoons to the inboard pontoon and vice versa as each step is taken.

Figure 3:
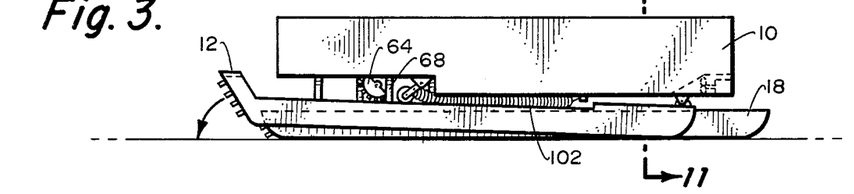
FIGS. 3 and 4 are semi-schematic side elevations of the walking vehicle illustrating the manner of operation.
Figure 4:
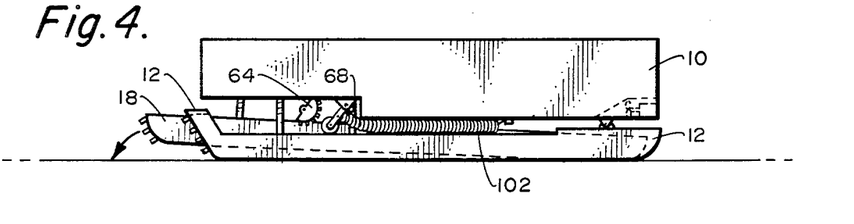
Figure 9:
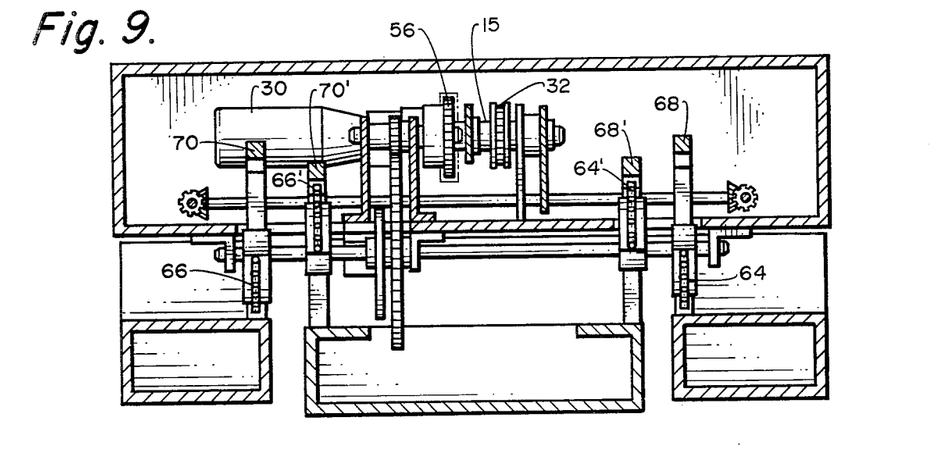
FIG. 9 is a sectional view taken at 9—9 of FIG. 5.
Figure 10:
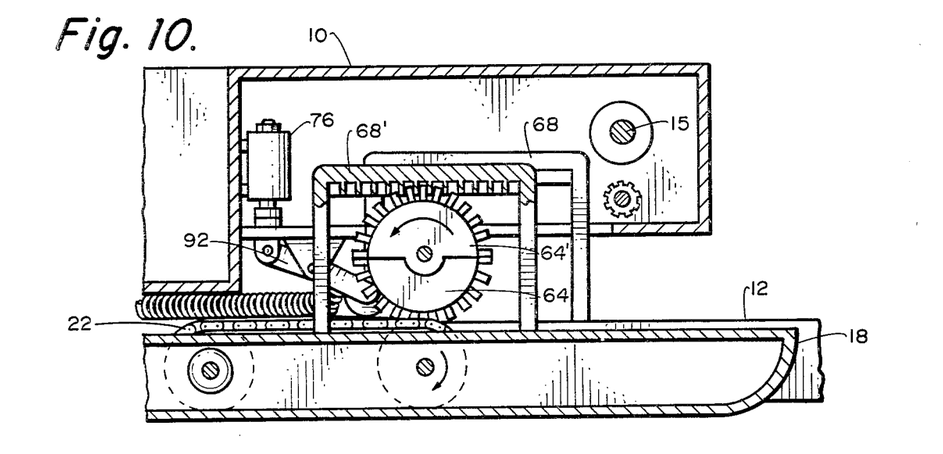
FIG. 10 is a sectional view taken at 10—10 of FIG. 5.
Figure 11:
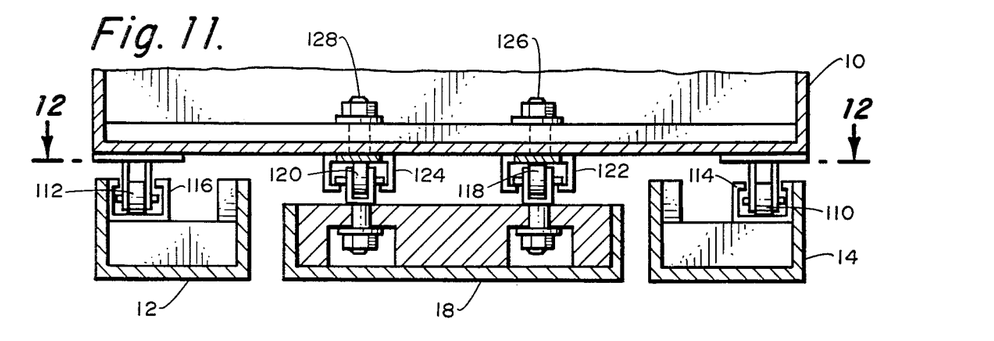
FIG. 11 is a sectional view taken at 11—11 of FIG. 3.

This is accomplished by shifting the weight of the deck from the moving pontoon or pontoons to the stationary pontoon and at the same time engaging a gear mechanism to move the deck along the stationary pontoon. In FIGS. 3 and 4 a stepping cycle is illustrated in which the outboard pontoons 12 and 14 are being moved forward a step while the inboard pontoon 18 remains stationary. In FIG. 4 the outboard pontoons 12 and 14 are stationary while the inboard pontoon 18 is in motion. While the outboard pontoon 12 is in motion, the deck 10 is being moved forward on the stationary inboard pontoon 18 by means of a half-gear 64 engaging a gear rack 68 mounted on the stationary pontoon 18, as illustrated in FIGS. 9, 10 and 11. This will be described in greater detail hereinafter.

Figure 5:
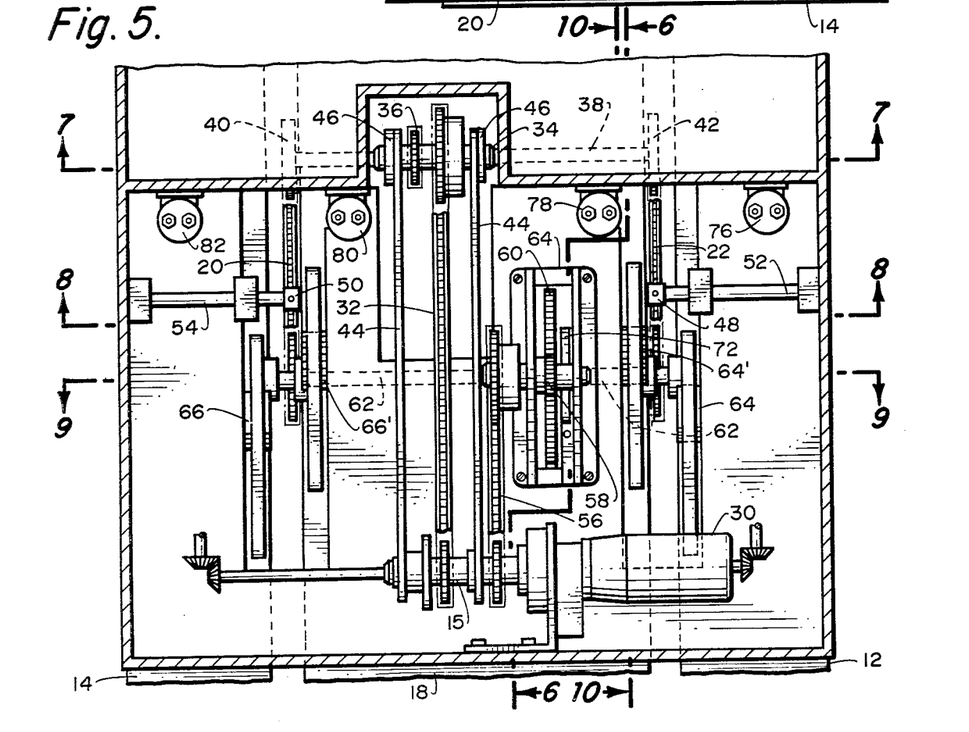
FIG. 5 is a sectional view taken at 5—5 of FIG. 1 illustrating the drive system.

The drive system for the amphibious transporter is illustrated in sectional view in FIG. 5, which is a plan view of the engine room. The motor or engine 30 supplies power to ovate chains 20 and 22 through a main chain drive 32 which drives floating shaft 34 connected by a second chain drive 36 to drive shaft 38 operating a gear 40 and second gear 42, which in turn drives the ovate chains 20 and 22 respectively. Floating shaft 34 is supported by horizontal rocker arms 44 and vertical rocker arms 46. The ovate chains 20 and 22 are mounted on opposite sides of the inboard pontoon 18 and the chains themselves linked by pivot pins 48 and 50 to shafts 52 and 54 mounted to the outboard pontoons 12 and 14. Only the forward end of the respective pontoons need to be lifted and moved forward with the rear or aft end allowed to drag or slide on the ground.

The engine 30 also provides a drive system for the deck through a chain 56 which drives a gear 58 engaging a main gear 60 on a shaft 62 supported in a frame 64. Also mounted on shaft 62 are half-gears 64 and 64' and 66 and 66'. The immediately adjacent half-gears, (e.g. 64 and 64') are mounted 180° out of phase, as illustrated in FIGS. 9 and 10. When, as illustrated in FIG. 10, the inboard pontoon 18 is stationary, the half-gear 64' will engage the gear rack 68' causing the deck 10 to move forward on the stationary inboard pontoon. This occurs simultaneously with movement of the outboard pontoons 12 and 14.

Figure 6:
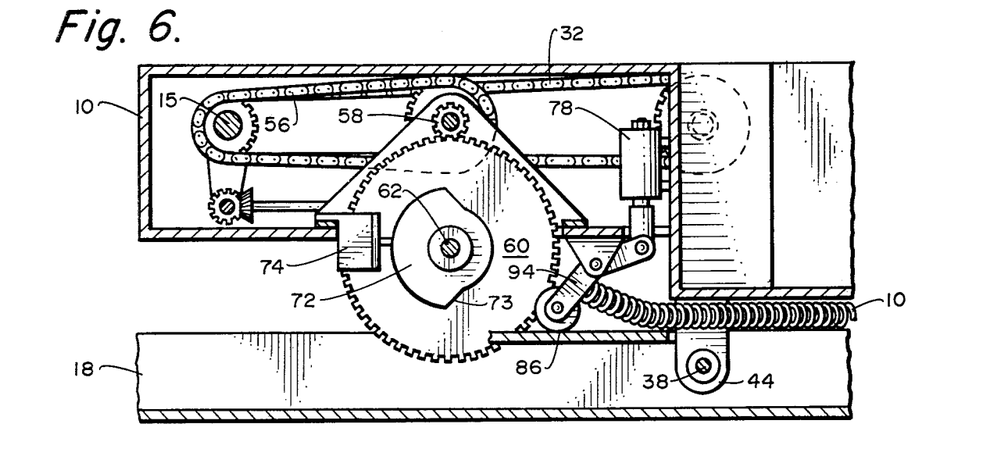
FIG. 6 is a sectional view taken at 6—6 of FIG. 5.
Figure 7:
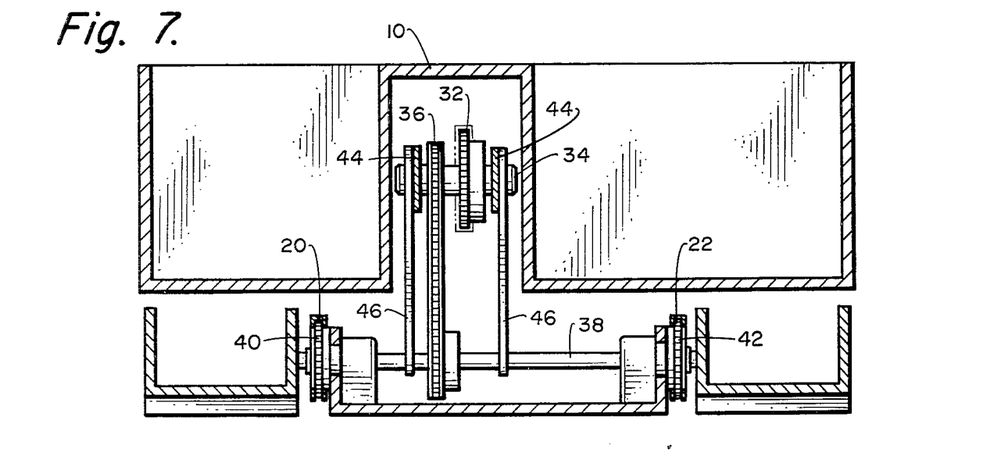
FIG. 7 is a sectional view taken at 7—7 of FIG. 5.

While the drive chains and gearing system for moving the pontoons and moving the deck are substantially independent, except that both are driven from the same shaft 15 connected to engine or motor 30, the weight of the deck must be synchronously shifted from the moving pontoon to the stationary pontoon. This is accomplished by a cam 72 mounted on shaft 62 for rotation therewith as illustrated in FIG. 6. The cam 72 operates a switch 74 which in turn operates solenoids 76, 78, 80 and 82. This can be seen more clearly in FIG. 8. The bow or forward end of deck 10 rides on rollers 84, 86, 88 and 90, which are mounted respectively on pivoting arms 92, 94, 96 and 98. The rollers are biased to their pivotally extended position by springs 100, 102, 104 and 106 upon release of the respective solenoid.

Figure 8:
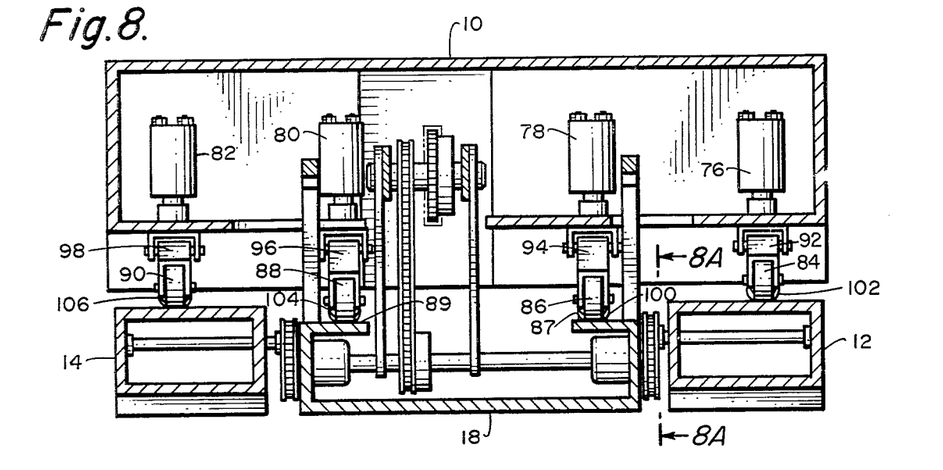
FIG. 8 is a sectional view taken at 8—8 of FIG. 5.
Figures 8A, 16B:
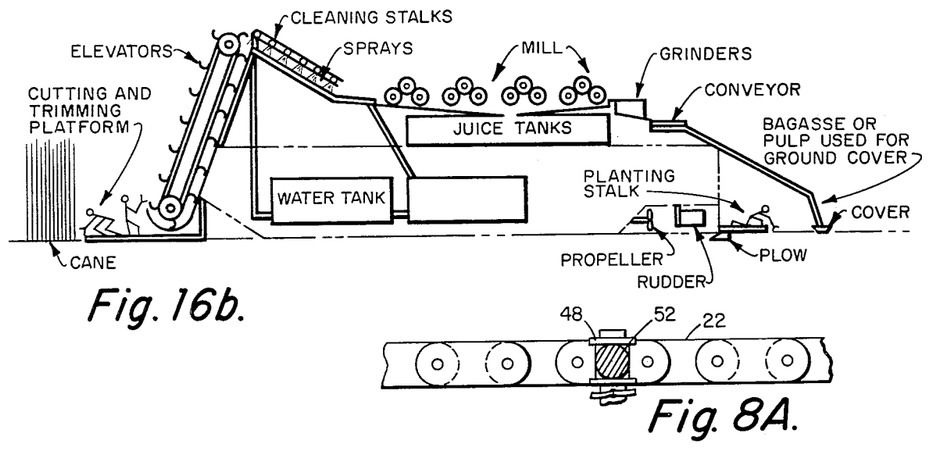
FIG. 8A is a detail view of the ovate chain taken at 8A–8A of FIG. 8.
FIGS. 16A and 16B illustrate schematically the adaptation of the amphibious transporter walking vehicle for harvesting purposes.

In FIG. 8, the deck 10 is resting on pontoon 18 with the pivot arms 94 and 96 being biased by their respective springs to extend rollers 86 and 88. To shift the weight from the inboard pontoon to the outboard pontoons, the cam 72 operates switch 74, releasing the pivot arms 92 and 98, while raising rollers 86 and 88 by operating pivot arms 94 and 96. The shifting of the weight of the deck from inboard to outboard, or vice versa, simultaneously causes engagement of the particular gear rack with the particular half-gear mounted on a stationary pontoon.

Thus, there are three systems which are substantially mechanically separate, but operate simultaneously and are synchronized with one another. That is, the drive system for the respective pontoons is a complete mechanical system substantially separate from the drive system for the deck, but operates simultaneously therewith. Likewise, the system for shifting the weight of the deck from the moving pontoon to the stationary pontoon is a complete, separate system, but synchronizes the shifting of the weight with the movement of the deck and the pontoon.

The drive system for the pontoons consists of the motor 30, driving chain 32, and chain 36, which subsequently drives ovate chains 20 and 22 to move the inboard or the outboard pontoons respectively. When the link 48, 50 between the chain and the respective outboard pontoons 12 and 14 is at the top of its cycle, these pontoons are being lifted and moved forward the distance equal to approximately half the length of the ovate chain. When the links 48, 50 between the ovate chains and the outboard pontoons are on the bottom of the cycle, then the inboard pontoon 18 is lifted and moved forward a distance equal to approximately half the length of the ovate chain. Thus, the inboard and outboard pontoons take respective steps approximately equal to half the length of the ovate chain in much the same manner as described in the patent referred to above.

The drive system for the deck consists of the motor 30 driving chain 56 which in turn drives gear 58 engaging main gear 60 which operates or drives main drive shaft 62. The half-gears 64 and 64' and 66 and 66' are mounted on this drive shaft 62. These half-gears alternately engage gear racks 68, 68' and 70 and 70' mounted on the inboard and outboard pontoons respectively. Thus, when the gear racks 68' and 70' on the inboard pontoon are in engagement with the half-gears 64' and 66', the gear racks 68 and 70 are disengaged from the half-gears 64 and 66. Thus, there is a redundant synchronizing feature in that when one half-gear (e.g. 64) is engaged with the gear rack on the stationary pontoon, the immediately adjacent half-gear (e.g. 64') is disengaged, because it is 180° out of phase. Further, the 180° rotation of one of the half-gears corresponds to a one-half the rotation of one of the ovate chains 20 and 22. Thus, the half-gear reaches the end of the rack on the stationary pontoon at the moment that pontoon is being lifted for a step forward, simultaneously disengaging from the corresponding rack as the rack is being lifted with the pontoon.

To summarize the stepping movement with the simultaneous constant speed movement of the deck, the operation, as illustrated in FIGS. 3 through 10, is as follows.

To begin, refer to FIG. 8 where the forward or bow end of the deck 10 is being supported on rollers 86 and 88 resting on surfaces 87 and 89 of the inboard pontoon with the half-gears 64' and 66' in engagement with racks 68' and 70'. In this position the half-gears are rotating counterclockwise as illustrated in FIG. 10, while the ovate chain is rotating clockwise, moving the outboard pontoons 12 and 14 forward. Simultaneously the deck is being rolled or moved forward on the inboard pontoon 18 by means of the half-gears 64' and 66' engaging the gear racks 68' and 70' on the stationary inboard pontoon. The step is illustrated in the figures with the outboard pontoons 12 and 14 approximately midway through a forward step.

By referring to FIG. 6 it can be seen that cam 72 is also approximately mid-point of its function or rotation. When the inboard pontoons reach their furthest forward point, which will equal the forward travel of the respective ovate chains 20 and 22, and begin to set down by rotation of the connecting link around the gear driving the ovate chain, the cam 72 also reaches camming surface 73 operating switch 74 to release the rollers 84 and 90 while raising rollers 86 and 88, shifting the weight of the deck from the inboard pontoon 18 to the outboard pontoons 12 and 14 at the time the inboard pontoon is about to be lifted. At this time, half-gears 64 and 66 engage the gear racks 68 and 70 to continue the constant speed movement of the deck 10 forward, except that the deck is now rolling on rollers 84 and 90 on the outboard pontoons 12 and 14.

As was indicated above, the aft or rear end of the pontoons 12 and 14 and 18 need not be completely lifted, but they are dragged or slid over the surface being traversed. The deck 10, however, is supported on the aft end of the pontoons as illustrated in FIG. 11. The deck 10 rests on outboard pontoons 12 and 14 by means of rollers 110 and 112 engaging tracks or guides 114 and 116 on the outboard pontoons 12 and 14 respectively. The deck 10 also rides on the inboard pontoon by means of rollers 118 and 120 riding in tracks or guides 122 and 124, pivotally attached to the deck 10 by bolts 126 and 128. This pivoted mounting of slides or guides 122 and 124 permits steering by moving the inboard pontoon 18 as illustrated in FIGS. 12 and 13.

Figure 12:
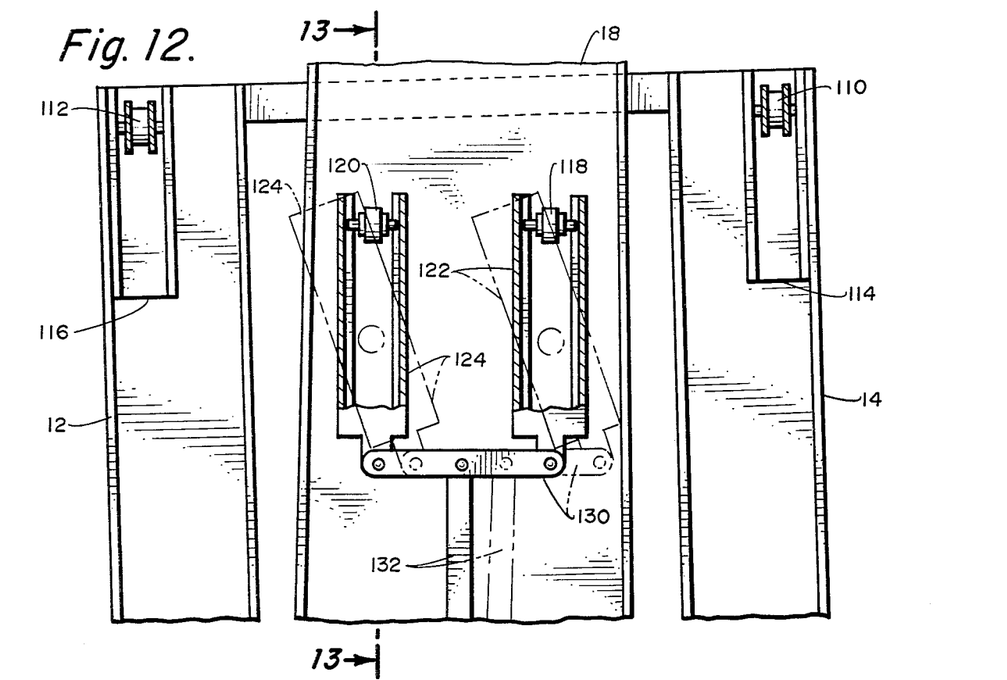
FIG. 12 is a sectional view taken at 12—12 of FIG. 11.
Figure 13:
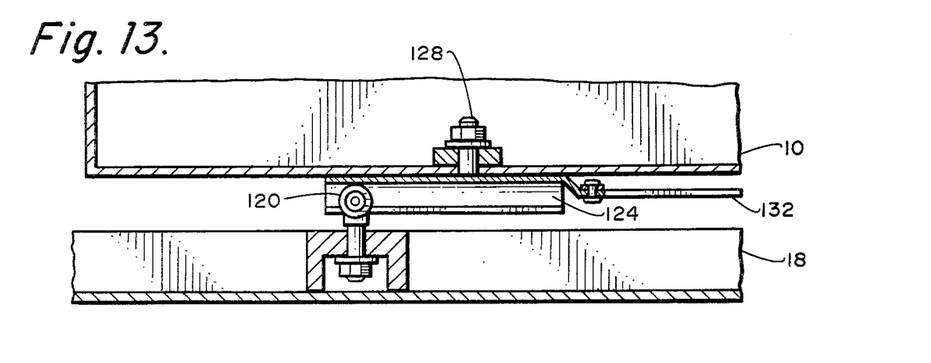
FIG. 13 is a sectional view taken at 13—13 of FIG. 12.

A steering mechanism is provided by means of a cross-arm 130 and a steering control arm 132 which permits the roller guides 122 and 124 to be shifted as illustrated in phantom, causing an angular shifting of the inboard pontoon 18 in the opposite direction as illustrated in FIG. 12, permitting a steering angle of approximately about 10° to 15°. This permits the transporter to be turned approximately 90° in six to nine steps. Further, the transporter may be completely turned in practically its own length by a move forward and then backward one step at a time along with appropriate activation and manipulation of the guides 122 and 124 as necessary.

For amphibious use the transporter would include a pair of propellers mounted on the aft end of the outboard pontoons. Conventional rudders and propellers would be used for steering and propulsion when the transporter is waterborne in much the same manner as was described in U.S. Pat. No. 2,667,937 referred to above. These propellers can be coupled to the motor by a drive system linked to the shaft 15 operated by the motor. The shaft 15 would drive a pair of gears linked to bevelled gears which operate drive shafts to the respective propellers. Obviously, the respective propellers could have separate independent drive systems, if desired.

Thus, there has been disclosed an amphibious transporter which has mobility, both on land and sea for performing a variety of excavating or agricultural purposes. Several different suggested uses for this system are illustrated in FIGS. 14 through 22.

Figure 14A:
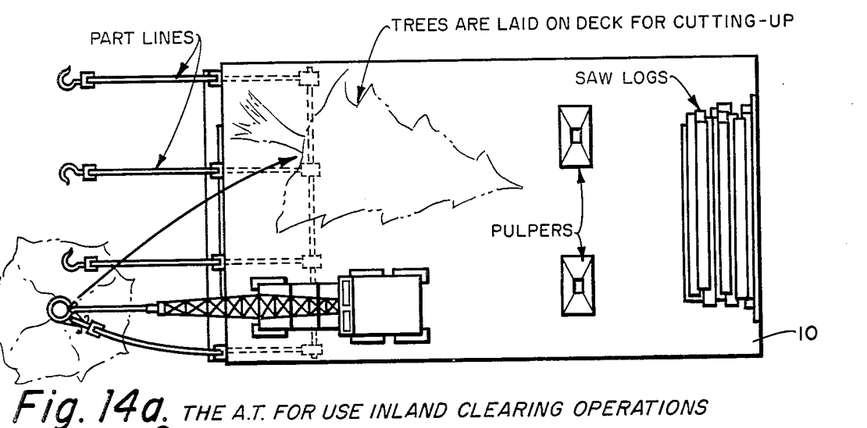
FIGS. 14A and 14B illustrate the amphibious transporter walking vehicle equipped for inland clearing operations.
Figure 14B:
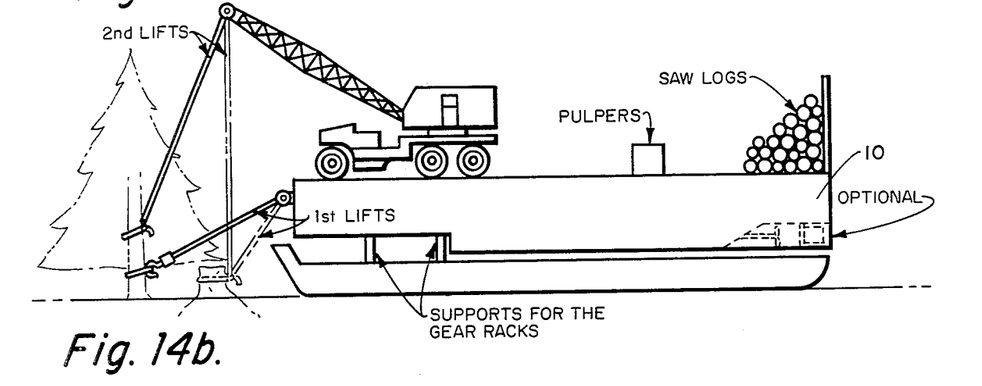
Figure 15:
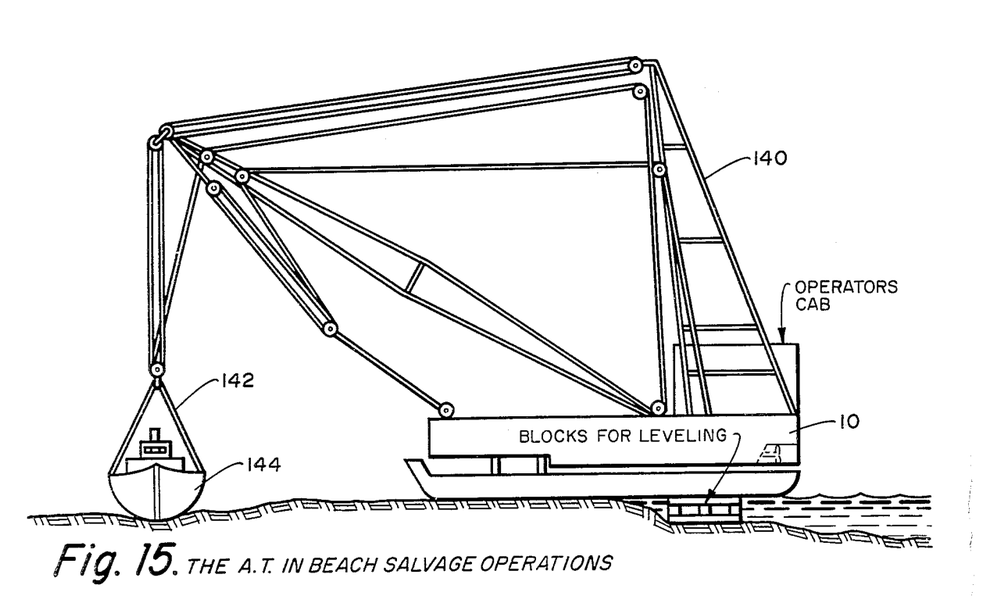
FIG. 15 illustrates the amphibious transporter walking vehicle equipped for beach salvaging operations.
Figure 16A:
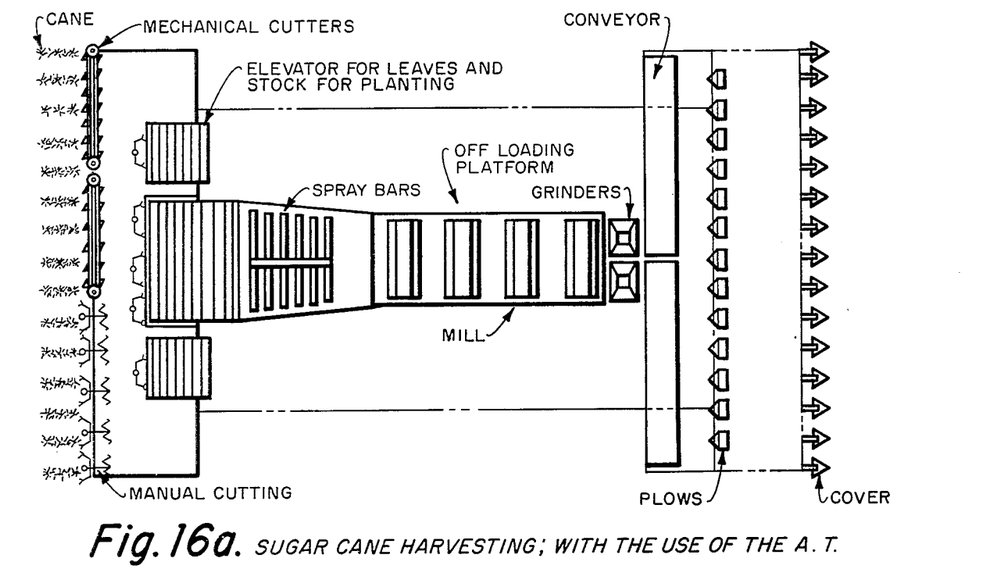
Figure 17:
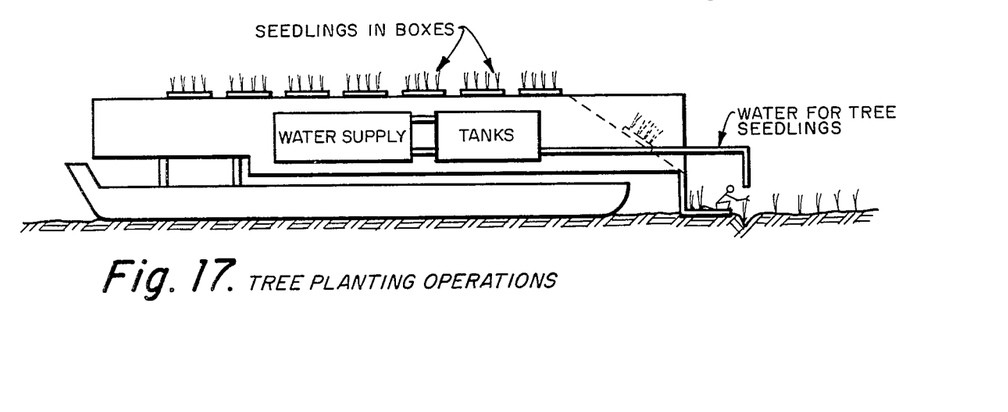
FIG. 17 is a semi-schematic illustration of an amphibious transporter utilized for tree-planting operations.

In FIGS. 14a and 14b the use of the amphibious transporter for inland clearing operations is illustrated with equipment and accessories mounted on the deck 10 as illustrated. This amphibious transporter or walking barge is suitable for this use because the tracking effort of the amphibious transporter disclosed herein is far superior to the conventional track laying or wheeled vehicle. The amphibious transporter can be used for beach salvage operations as illustrated in FIG. 15 in which a crane 140 is mounted on the transporter deck 10. With this type of configuration, the amphibious transporter system can be used in a number of ways to assist so-called amphibious operations. Its ability to traverse areas now denied to conventional equipment should be noted. Offshore reefs, sandbars, etc. can be walked over. By short forward and backward moves and by hand-placing blocking, the amphibious transporter can literally block raise itself above the ground. With a number of the amphibious transporters outfitted with the lifting gear as illustrated, on each side of a stranded ship, the ship can be lifted and walked back out to deep water. A series of slings 142 may be passed under the ailing vessel 144 to free the vessel from ground contact. A number of amphibious transporters acting in unison can carry the vessel back to sea. The amphibious transporter can easily be adapted for a variety of agricultural uses, such as sugar cane harvesting and tree-planting operations, as illustrated in 16a, 16b and FIG. 17. The amphibious transporter would be equipped and operated substantially as illustrated, which illustrations are self-explanatory.

Figure 18A:
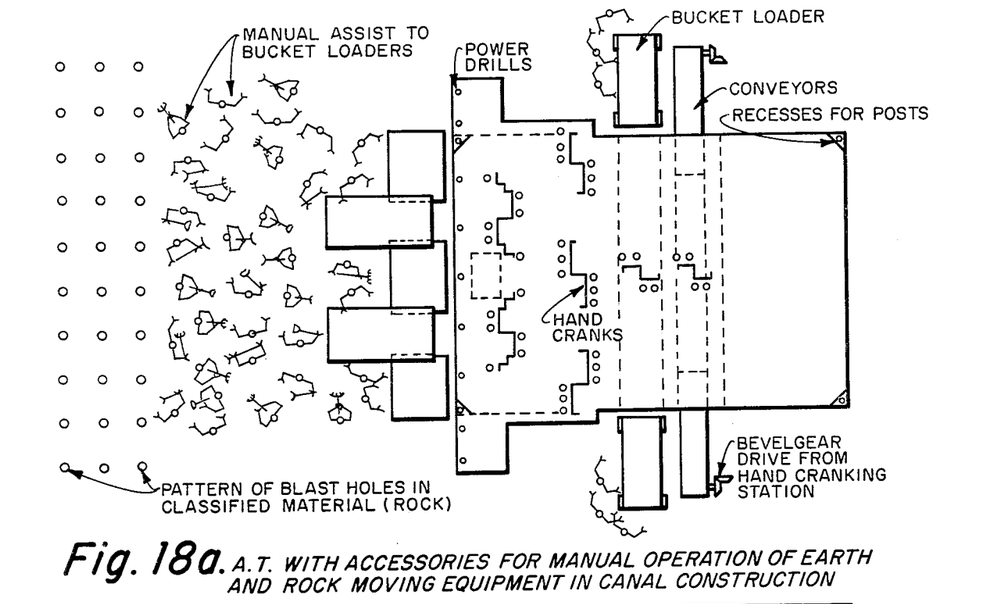
FIGS. 18A, 18B and 18C illustrate schematically the operation of the amphibious transporter walking vehicle for earth and rock moving and canal structure operations.
Figure 18B:
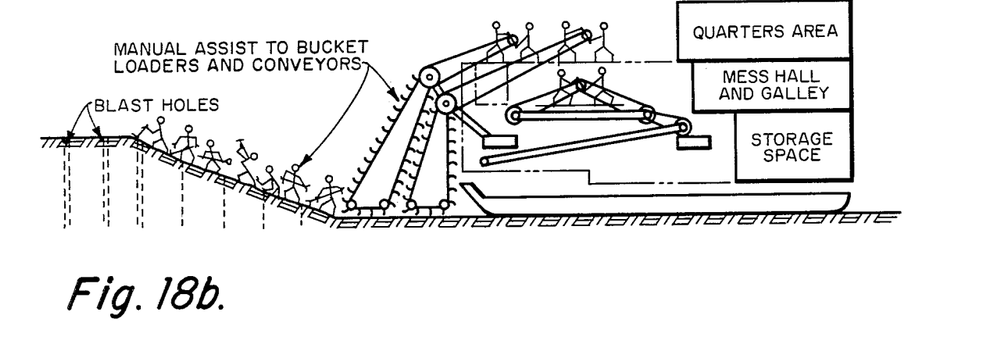
Figure 18C:
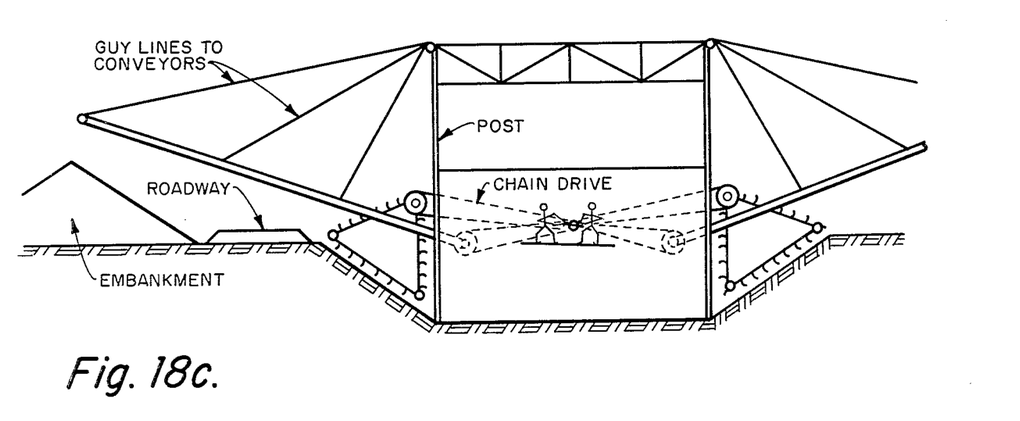
Figure 19A:
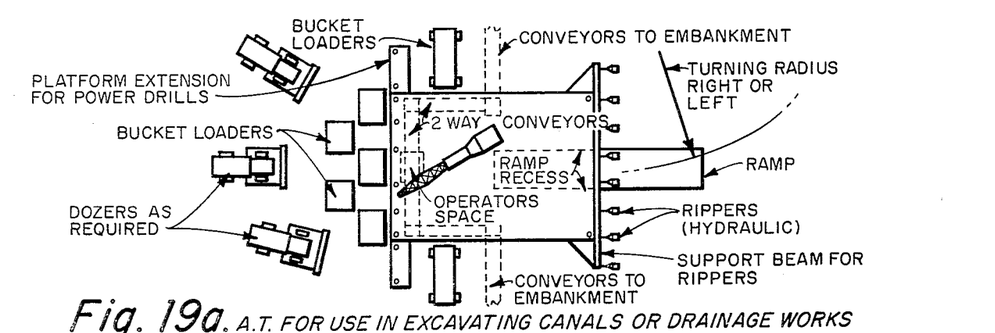
Figures 19B, 19C:
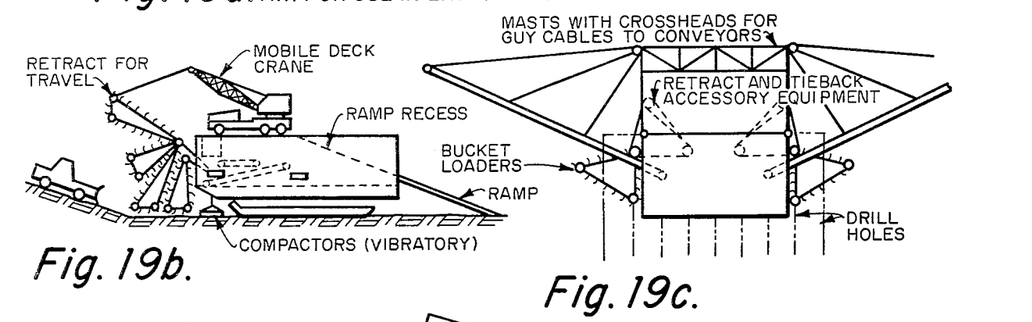
Figure 19D:
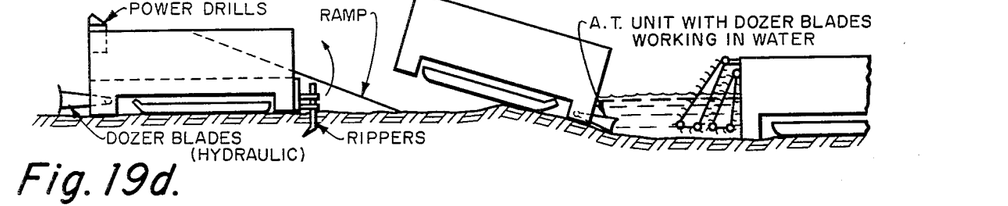
Figure 19E:
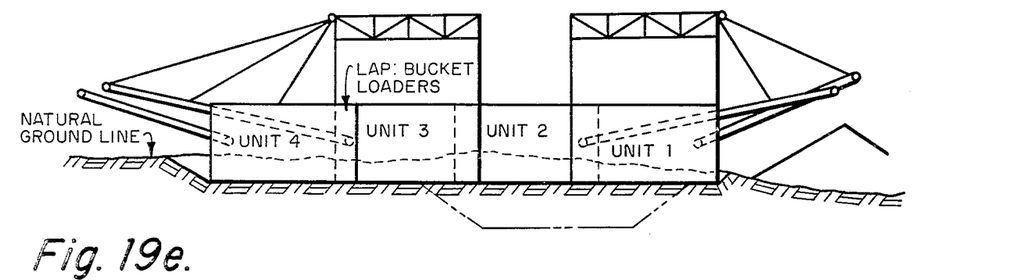
Figure 19F:
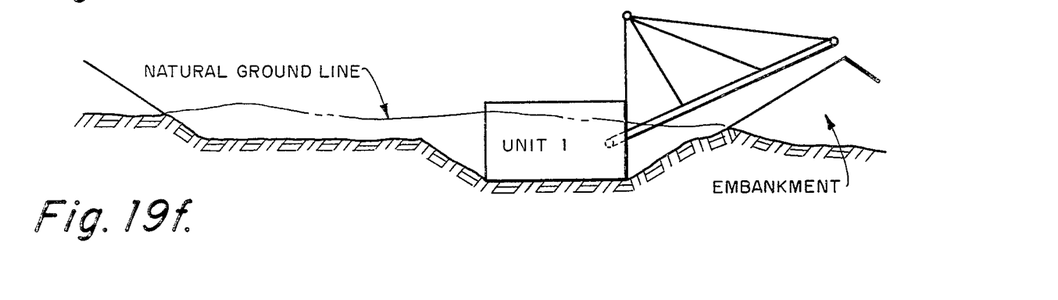
Figures 20A, 20D:
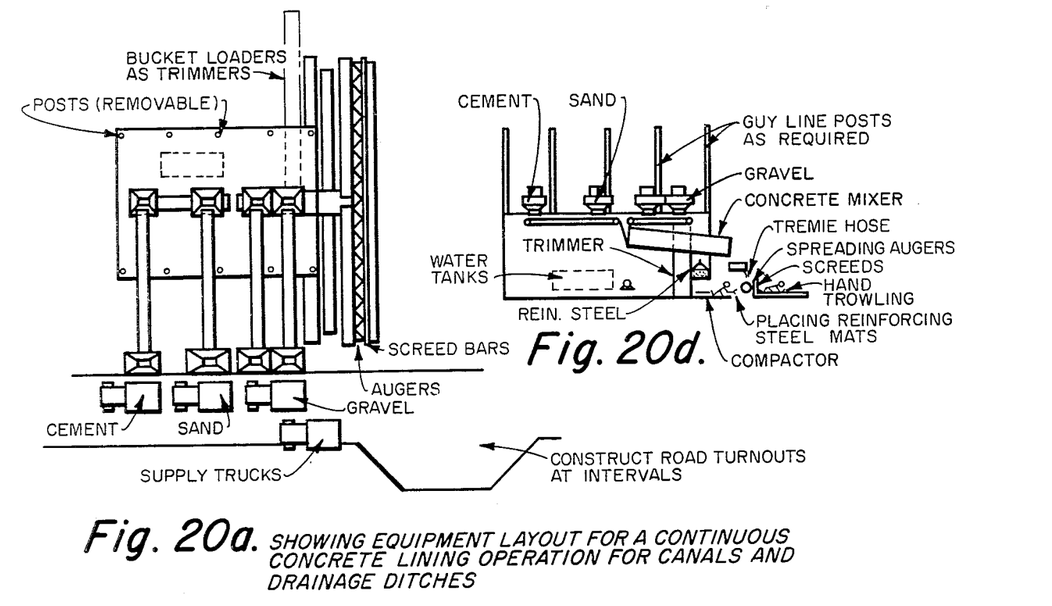
Figure 20B:
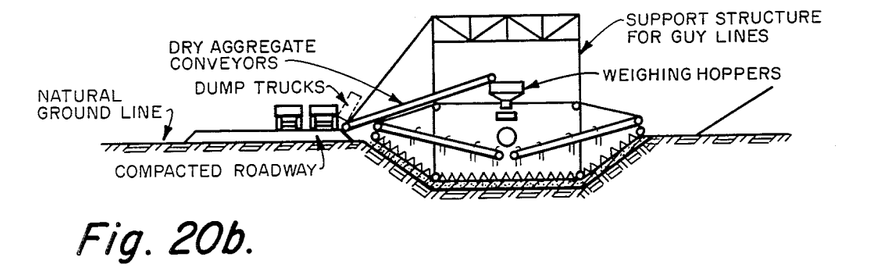
Figure 20C:
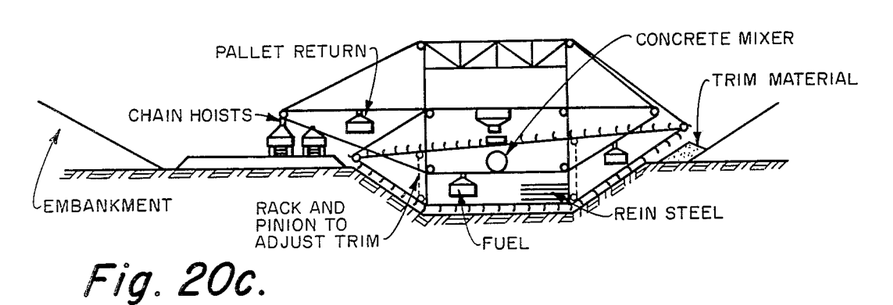

The use of the amphibious transporter with accessories for manual operation of earth and rock-moving equipment and in canal construction is illustrated in FIGS. 18a through 18c. As indicated in FIG. 18a, some power installations would be necessary in order to operate drills for blasting operations. In this case the units are merely moved forward over the area and the holes drilled in the desired pattern. After a predetermined area has been loosened, the amphibious transporter backs down and the process of removing the material proceeds as before. Large pieces of rock can be broken up by hand labor to sizes that can easily be carried by bucket loaders onto conveyors. If it is desired to excavate a canal or drainage ditch, any number of units or ATs (amphibious transporters) may be employed. Again, the figure is somewhat self-explanatory with only manual power needed to operate the conveyors. Since each unit provides a stable and mobile working platform or deck, framework can be installed to provide cover and shade for the workers or even for installation of facilities to house and feed operating and construction crews. It should be noted that in the event the innards are not used in water, only a bare skeletal framework sufficient to support accessory structures and power train for the land propulsion is needed. The drawings illustrate in FIGS. 19a through 19f the principal accessories that can be attached to the AT for use in excavating canals or drainage ditches. Shown is the excavation of a canal with approximately a fifty-foot bottom and a space for a parallel roadway. Note that power drills for use in rock and rock soil materials are part of the necessary equipment and readily available when needed. Rippers and dozer blades can also be made part of the de-mountable equipment, if required. It is felt that bucket loaders will perform adequately when silt, sand, clay or other soil materials are being excavated. Otherwise the figures are generally self-explanatory of the use of the amphibious transporters.

FIGS. 20a through 20d illustrate the amphibious transporter concept adapted for concrete lining of canals and drainage ditches in a continuous operation. The drawings show the unit or amphibious transporter with the accessories described necessary to line a canal having approximately a fifty-foot width. The aggregate would be trucked alongside the amphibious transporters and with properly placed hoppers and side dump trucks discharged into the unit that is moving at a constant level rate.

Obviously, the transporter, because of its versatility and adaptability, can be employed, with suitable accessories, for a variety of uses in addition to those shown. With suitable accessories the amphibious transporter can be used for canal dredging, trenching and laying of pipe lines. The transporter can be equipped with buoyancy tanks, sealed engine room with access, and air shafts to act as a base for temporary superstructure for canal excavation. Multiple transporters having turntable superstructures supporting conveyor systems could be used to effect a selective pattern for disposal of excavated material. The buoyancy tanks would allow the transporters to become fully amphibious when required. Their adaptability to strip or surface mining as well as land filling or restoration of ground cover is self-evident.

Obviously, many modifications and variations of the present invention are possible in light of the above teachings. It is therefore to be understood that the full scope of the invention is not limited to the details disclosed herein but may be practiced otherwise than as specifically described.

What is claimed is:

1. An amphibious walking transport system comprising:
   a deck body;
   a pair of outboard pontoons;
   a center inboard pontoon;
   pivot means for pivoting the inboard pontoon at a predetermined angle to the right or left of the outboard pontoons whereby the transport may be steered;
   support means supporting said deck body on the inboard and outboard pontoons;
   synchronizing means for continuously moving said deck body forward alternately on the respective stationary inboard pontoon or outboard pontoons, whereby said deck body moves forward at constant speed.

2. The transport system according to claim 1 wherein:
   said deck body is supported by rollers attached to said inboard pontoon,
   roller guide means attached to said deck body,
   pivot means pivotally connecting said roller guide means to said deck body whereby pivoting of said roller guide means pivots said inboard pontoon to steer said transport.

3. The transport system according to claim 1 wherein said synchronizing means includes weight shifting means for shifting the weight of said deck to one of said stationary pontoons during movement of the other of said pontoons.

4. The transport system according to claim 3 wherein said deck body support means includes said weight shifting means.

5. The transport system according to claim 4 wherein said deck body support means comprises:
   a plurality of rollers supporting the front and rear of said deck on said pontoons,
   guide means for guiding said rollers whereby said deck body may roll on said pontoons.

6. The transport system according to claim 3 wherein said weight shifting means comprises:
   at least four front rollers with a pair resting on the inboard pontoon and one each of a second pair resting on each respective outboard pontoon; and
   retracting means for retracting the inboard pair and the outboard pair alternately whereby the rollers resting on a respective pontoon are retracted during movement.

7. The transport system according to claim 6 wherein said synchronizing means includes:
   a shaft,
   a plurality of half gears mounted on said shaft with mutually adjacent half gears being 180° out of phase,
   a plurality of gear racks mounted on said pontoons,
   engaging and release means for alternately engaging a half-gear on said shaft with the gear racks on the non-moving pontoon while releasing the mutually adjacent half-gear out of engagement with the gear racks on the moving pontoons.

8. The transport system according to claim 7 including:
   pivot means for pivotally supporting said rollers,
   solenoid means connected to said pivotally mounted rollers for alternately extending and retracting said rollers,
   switch means for switching said solenoids alternately; and
   cam means on said shaft for alternately operating said switch means whereby the rollers resting on the moving pontoons are retracted during movement while the rollers resting on the non-moving pontoon are released.

9. The transport system according to claim 8 wherein said lifting means comprises:
   a pair of ovate chains mounted on opposite sides of the inboard pontoon,
   a pin connecting each outboard pontoon to the chain on said ovate chain; and
   drive means for driving said ovate chain whereby the outboard and inboard pontoons are alternately picked up, moved ahead and put dowwn in a walking-like motion.

10. The transport system according to claim 9 wherein said drive means comprises:
    a shaft mounted on the inboard pontoon,
    a pair of gears on opposite ends of said shaft engaging each ovate chain,
    a motor mounted on said deck body, and
    chain drive means connecting said motor to said pair of gears; and
    a pair of vertically and horizontally pivotable rocker arms supporting said chain drive means.

* * * * *